(12) United States Patent
Vrcelj

(10) Patent No.: US 7,347,096 B2
(45) Date of Patent: Mar. 25, 2008

(54) DIGITAL ACCELEROMETER

(76) Inventor: Nebojsa Vrcelj, #303- 1715 West 11th Avenue, Vancouver, British Columbia (CA) V6J 2C2

(*) Notice: Subject to any disclaimer, the term of this patent is extended or adjusted under 35 U.S.C. 154(b) by 0 days.

(21) Appl. No.: 11/188,110

(22) Filed: Jul. 25, 2005

(65) Prior Publication Data

US 2007/0028689 A1 Feb. 8, 2007

(51) Int. Cl.
*G01P 15/00* (2006.01)

(52) U.S. Cl. .............................. 73/514.17; 73/514.18; 73/514.19; 73/514.21

(58) Field of Classification Search ............. 73/514.17, 73/514.18, 514.19, 514.21, 514.22, 514.23, 73/514.24; 341/145

See application file for complete search history.

(56) References Cited

U.S. PATENT DOCUMENTS

| 4,088,027 A | * | 5/1978 | Hernandez et al. ...... 73/514.21 |
| 4,282,470 A | * | 8/1981 | Reynolds .................... 318/648 |
| 4,315,434 A | * | 2/1982 | Eastman .................... 73/514.22 |
| 5,440,939 A | * | 8/1995 | Barny et al. ............. 73/862.61 |
| 5,831,164 A | * | 11/1998 | Reddi et al. ............. 73/514.01 |

* cited by examiner

*Primary Examiner*—Hezron Williams
*Assistant Examiner*—Samir M. Shah
(74) *Attorney, Agent, or Firm*—Cameron IP

(57) ABSTRACT

A force-balance accelerometer having a pick-off coil responsive to displacement of a seismic mass from a balance position for providing an output corresponding to the displacement, includes a digital signal processor including tow pulse width modulation generators for converting the output of the pick-up coil to a digital signal, and a torque coil responsive to the digital signal for rebalancing the seismic mass by restoring the mass to the balance position. The processor outputs the digital signal as first and second PWM signals, which control the digital signal.

20 Claims, 15 Drawing Sheets

$$I_{TOTAL} = DutyCycle_{LSW} \times I_0 +$$
$$\{DutyCycle_{MSW\ Full\ Scale} \times I_1\} +$$
$$\{DutyCycle_{MSW} \times I_2\}$$

$$= DutyCycle \times (I_{MAX}/2^{24}) +$$
$$\{DutyCycle_{MSW\ Full\ Scale} \times (I_{MAX}/2^{14})\} +$$
$$\{DutyCycle_{MSW} \times (I'_{MAX}/2^{14})\}$$

$$I'_{MAX} = I_{MAX}/2^4$$
$$DutyCycle_{LSW} = 0, 1, ..., 2^{10}-1$$
$$DutyCycle_{MSW\ Full\ Scale} = 0, 1, ..., 2^{14}-1$$
$$DutyCycle_{MSW} = 0, 1, ..., 2^{14}-1$$

FIG. 4B

DIGITAL ACCELEROMETER

BACKGROUND OF THE INVENTION

1. Field of the Invention

The present invention relates to force-balance accelerometers and, more particularly, to feedback loops for the pick-off coils of force-balance accelerators.

2. Description of the Related Art

In U.S. Pat. No. 4,088,027, issued May 9, 1978 to Hernandez et al., there is disclosed a force balance servo accelerometer including a D'Arsonval type mechanism for rebalancing, between a pair of sensing coils, a seismic mass moved by acceleration. The D'Arsonval type mechanism comprises a pair of suspension beams mounted in parallel planes in a liquid filled cylindrical housing. A pair of axially aligned taut wires support a torque coil between the suspension beams. The coil surrounds a permanent magnet fixedly mounted in the housing. An arm extending outwardly from the coil, transverse to the axis of the taut wires, supports the seismic mass between the sensing coils, which are mounted in the housing. The sensing coils form two arms of a bridge circuit energized by an oscillator connected across one pair of opposing terminals of the bridge. The signal developed across the other pair of opposing terminals is applied to a differential amplifier. The resultant difference signal is sine wave multiplied with the output of the oscillator in a quadrature detector. The output of the quadrature detector, which is related to the acceleration of the seismic mass, is applied to the coil of the D'Arsonval mechanism to rebalance the seismic mass. A bellows mounted on one end of the housing allows the liquid in the housing to expand and contract as the temperature of the environment in which the D'Arsonval type mechanism is located changes.

In U.S. Pat. No. 4,315,434, issued Feb. 16, 1982 to Marcus R. Eastman, there is disclosed an accelerometer, the output of which is sent to a pulse width modulating digitizing circuitry comprising a comparator to generate a PWM signal, a flip-flop steering circuit, an "H" switch to toggle a torquer constant current either positive or negative, and an AND gate to gate clock pulses for the output.

The accelerometer taught in the afore-said U.S. Pat. No. 4,315,434 has the disadvantage of a continuous torquer current, i.e. a bipolar current through a torque coil, and therefore a large power consumption. Furthermore, with reference to FIG. 2 of Eastman, it is clear that the feedback loop from a pick-off coil (14) to a torque coil (24) consists entirely of analog components, with exception of the flip-flop (22). Therefore, the accelerometer of the Eastman reference is very susceptible to aging and drift of components, temperature, and noise sources. The Eastman reference does not provide a technique to compensate for the above effects on the components, and therefore must be returned to the manufacturer for calibration.

An additional disadvantage of that accelerometer is that it does not provide a measured value for the acceleration, but instead, provides a digital pulse train that is proportional to the sensed acceleration (see column 2, line 6). Clearly, additional circuitry is required in order to obtain a measurement of the acceleration.

That prior accelerometer has the disadvantage of including much of the feedback loop of the accelerometer in the analog domain, which makes it overly sensitive to temperature, manufacturing and aging tolerances.

BRIEF SUMMARY OF THE INVENTION

In a first aspect of the present invention, there is provided a force-balance accelerometer comprising a movable seismic mass, a pick-off coil responsive to displacement of the seismic mass from a balance position for providing an output corresponding to the displacement, means for converting the output of the pick-up coil to a digital signal, and a torque coil responsive to the digital signal for rebalancing the seismic mass by restoring the mass to the balance position.

In a second aspect of the present invention, there is provided a force-balance accelerometer comprising a movable seismic mass, a pick-off coil responsive to displacement of the seismic mass from a balance position for providing an output corresponding to the displacement, means for converting the output of the pick-up coil to a digital signal, a torque coil responsive to the digital signal for rebalancing the seismic mass by restoring the mass to the balance position, and means for outputting the digital signal as first and second PWM signals.

In a third aspect of the present invention, there is provided a force-balance type accelerometer having a negative feedback network and one or more feedback paths. The negative feedback network is operable to rebalance a mass accelerated by an external force. Each of the feedback paths provides an analog-to-digital conversion of a system variable that is monitored by the negative feedback network for changes in a parametric value. The negative feedback network compensates for the changes in the parametric values, thereby calibrating the accelerometer.

In a fourth aspect of the present invention, there is provided a high resolution digital to analog converter for converting a digital signal to an analog signal that comprises first and second low resolution PWM generators, first and second switches and first and second current sources. The first and second PWM generators provide first and second PWM signals respectively. The first PWM generator is controlled by a most significant word of the digital signal, and the second PWM generator is controlled by a least significant word of the digital signal. The first and second switches are controlled by the first and the second PWM signals respectively. The first and second current sources have first and second currents respectively. The first and second currents are switched by the first and the second switches, thereby providing first and second switched currents respectively. The analog signal is obtained by the combination of the first and second switched currents.

In a fifth aspect of the present invention, there is provided a method of providing a high resolution DAC for converting a digital signal to an analog signal comprising the steps of providing a first PWM signal having a duty cycle corresponding to the most significant word of the digital signal; providing a second PWM signal having a duty cycle corresponding to the least significant word of the digital signal; providing a first electrical signal, said first electrical signal having a duty cycle equal to the duty cycle of the first PWM signal; providing a second electrical signal, said second electrical signal having a duty cycle equal to the duty cycle of the second PWM signal; and combining the first the second electrical signals to provide the analog signal.

The present invention is preferably embodied as a seismic motion sensor and, more particularly, as a broadband type of force-balance accelerometer used to measure signals in a wide range of amplitudes and frequencies, the performance of which strongly depends on the performance of a feedback loop.

The feedback loop is digital with a minimum number of components, designed using primarily integrated circuits, and relying on an optimized way of current switching to reduce the required space sand to improve temperature stability and noise immunity, in comparison to prior art accelerometers using an analog feedback loop, while maintaining good dynamic performance.

State of the art pulse width modulation (PWM) generators in digital signal processors are limited by fifteen bits of resolution, and therefore the dynamic range of a digital-to-analog converter comprising one of these low resolution PWM generators is limited to fifteen bits of resolution.

The technique of the present invention overcomes this limitation by providing a digital-to-analog converter of substantially greater dynamic range by combining two or more low resolution PWM generators that, in combination with additional circuitry, theoretically provide any number of bits of accuracy. For example, the preferred embodiment of the invention illustrates a twenty four bit, high resolution digital-to-analog converter, the output of which is applied to the torque coil, which is achieved by combining two low resolution PWM generators that produce respective PWM signals.

The PWM signals from respective PWM generators each contribute to the high resolution output by varying its respective duty cycle and, therefore, an electrical signal, i.e. a current and/or voltage signal, applied to the torque coil. The current flowing through the torque coil is discrete and, in contrast to the well known PWM patterns, also includes amplitude control. The amplitude of the current flowing through the torque coil is controlled by providing a feedback path for the voltage signal across the torque coil. This provides an additional level of control of energy delivered to the load, i.e. the torque coil.

The primary purpose of the pulse amplitude control is to compensate for the electrical drifts in the torque coil, caused, for example, by aging or temperature change, thus allowing low frequency components to be differentiated from the electrical drifts and promoting proper distribution of the currents related to each PWM generator. The dynamic method of the PWM signal pulse amplitude control reduces the amount of noise generated by current switching, for example, it reduces power supply noise.

The frequency and period of the pulse stream does not affect the delivered energy, which depends only on the duty cycle. Moreover, using the symmetric driving pattern described herein, linearity of the system is dramatically improved by removing the effects of transient processes, making the delivered energy directly proportional to the pulse width. The amplitude control is a kind of calibration that is performed in run time without interruption of the data acquisition process.

BRIEF DESCRIPTION OF THE DRAWINGS

The invention will be more readily understood from the following description of an embodiment thereof given, by way of example only, with reference to the accompanying drawings, in which:—

FIGS. 4A & 4B show diagrammatic views of a digital to analog converter of the embodiment of FIGS. 1A, 1B & 1C;

DESCRIPTION OF THE PREFERRED EMBODIMENT

Figure 1A:
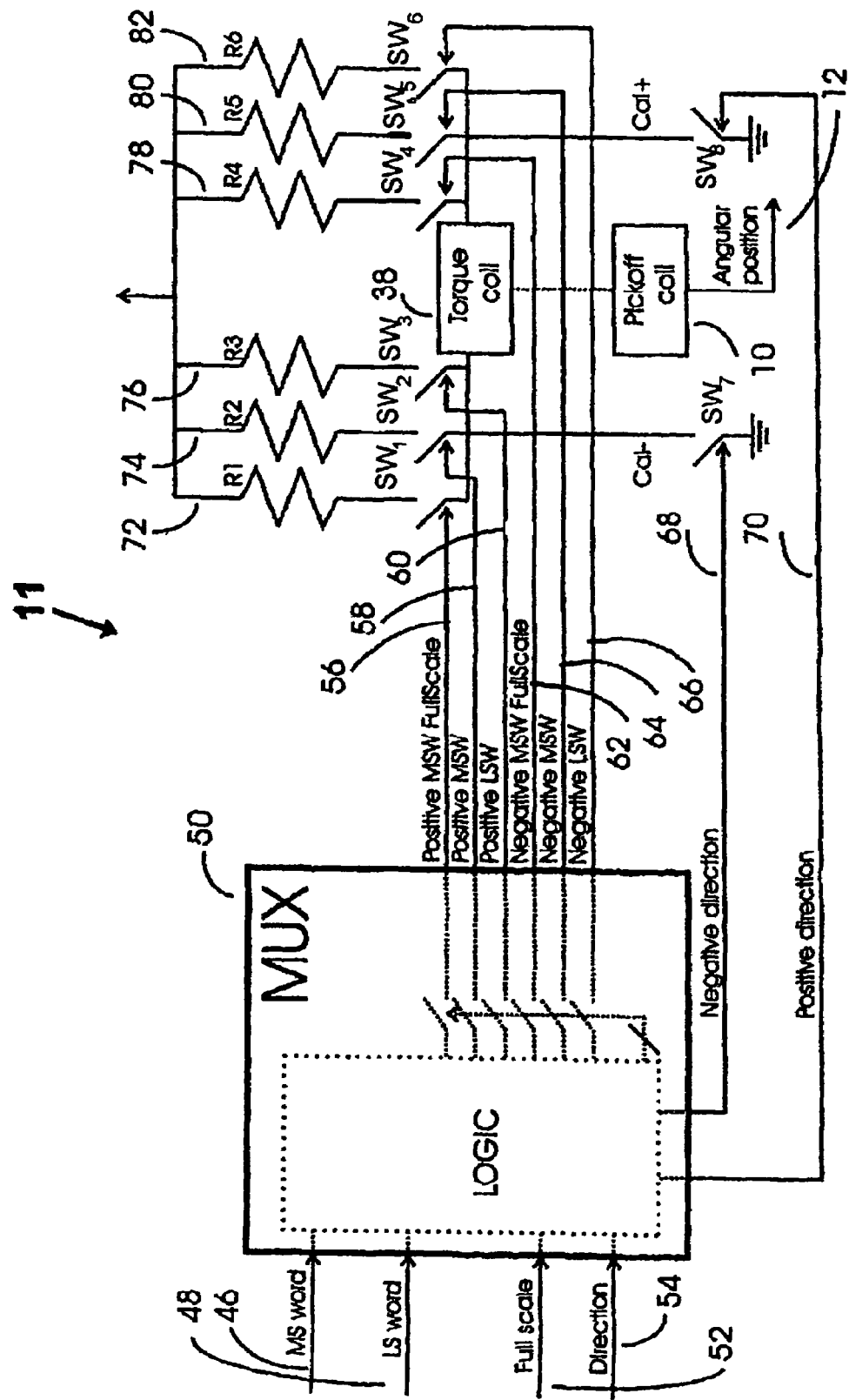
FIGS. 1A, 1B & 1C show block diagram views according to one embodiment of the present invention.

Referring to the figures and firstly to FIGS. 1A, 1B, 1C & 2, there is a force balance-type accelerometer indicated generally by reference numeral 11, which has a fluid-damped metal-flexure suspension. There is a pick-off coil 10 and an unbalanced weight 13 attached to a shaft 15 forming a pendulum, which is suspended in a permanent magnetic field and is free to move in one degree of freedom only. When subjected to acceleration, this pendulum moves with respect to the accelerometer frame.

Figure 7A:
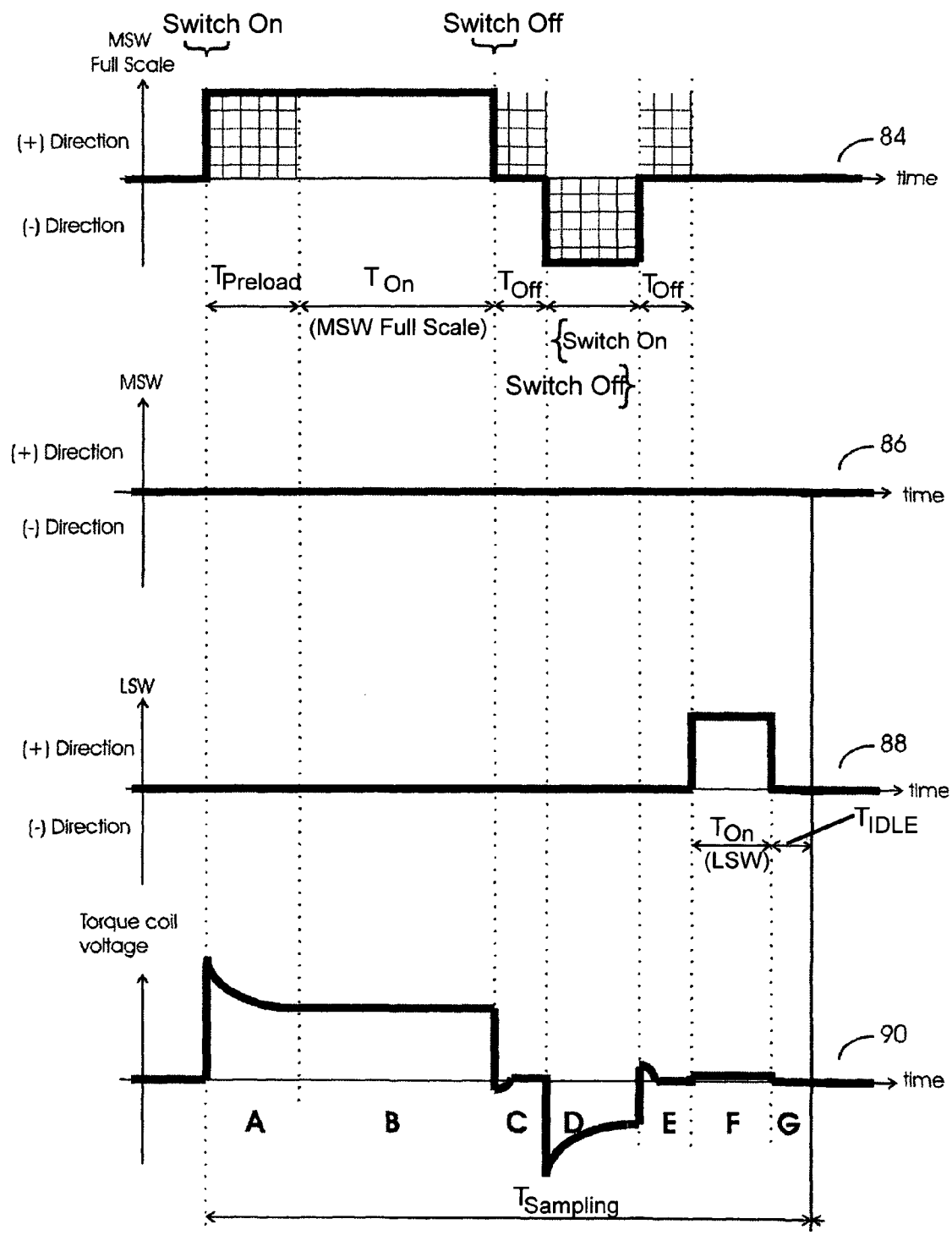
FIGS. 7A & 7B shows a graphical views of pulse width modulated signals of the embodiment of FIGS. 1A, 1B & 1C.
Figure 7B:
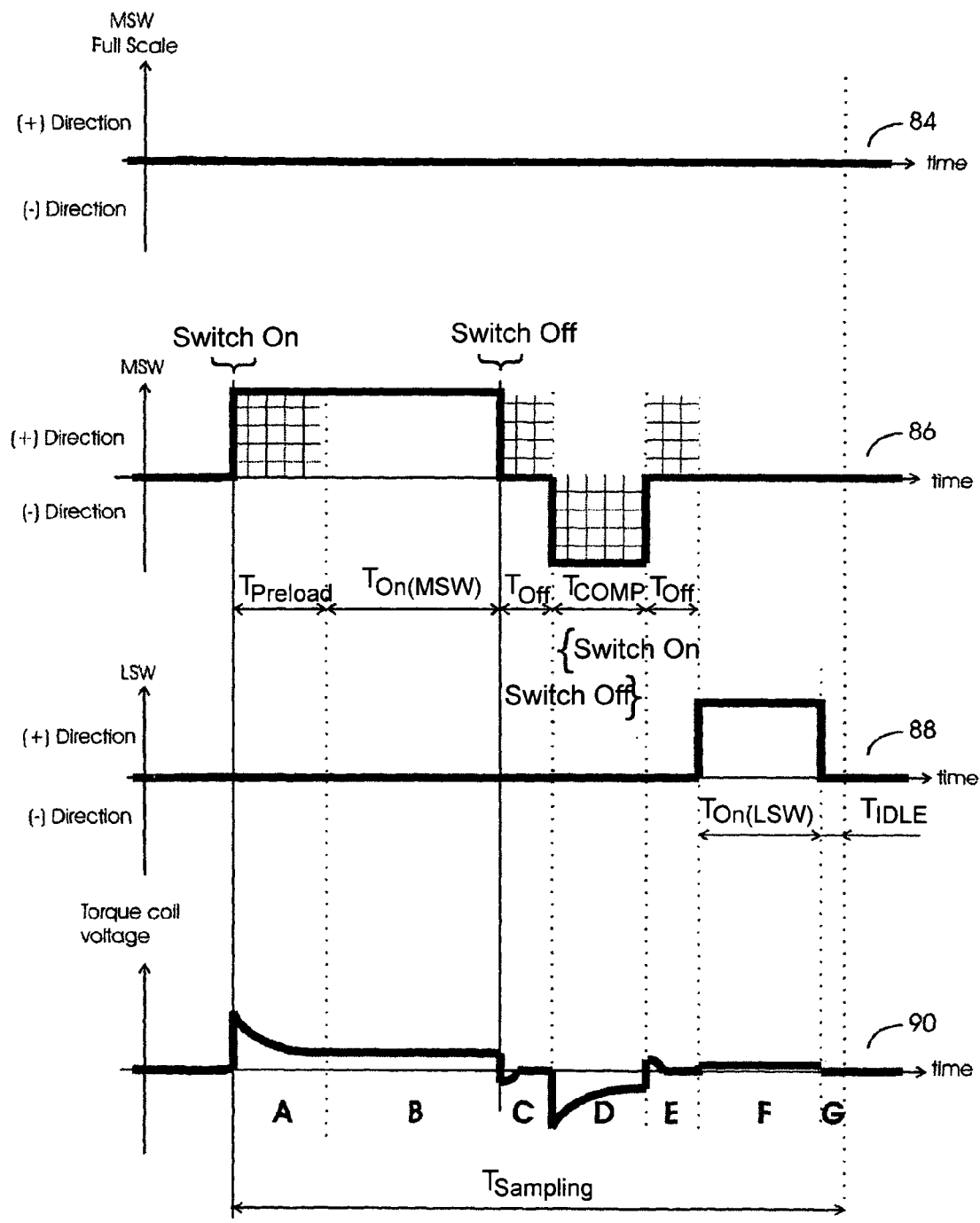
Figure 8A:
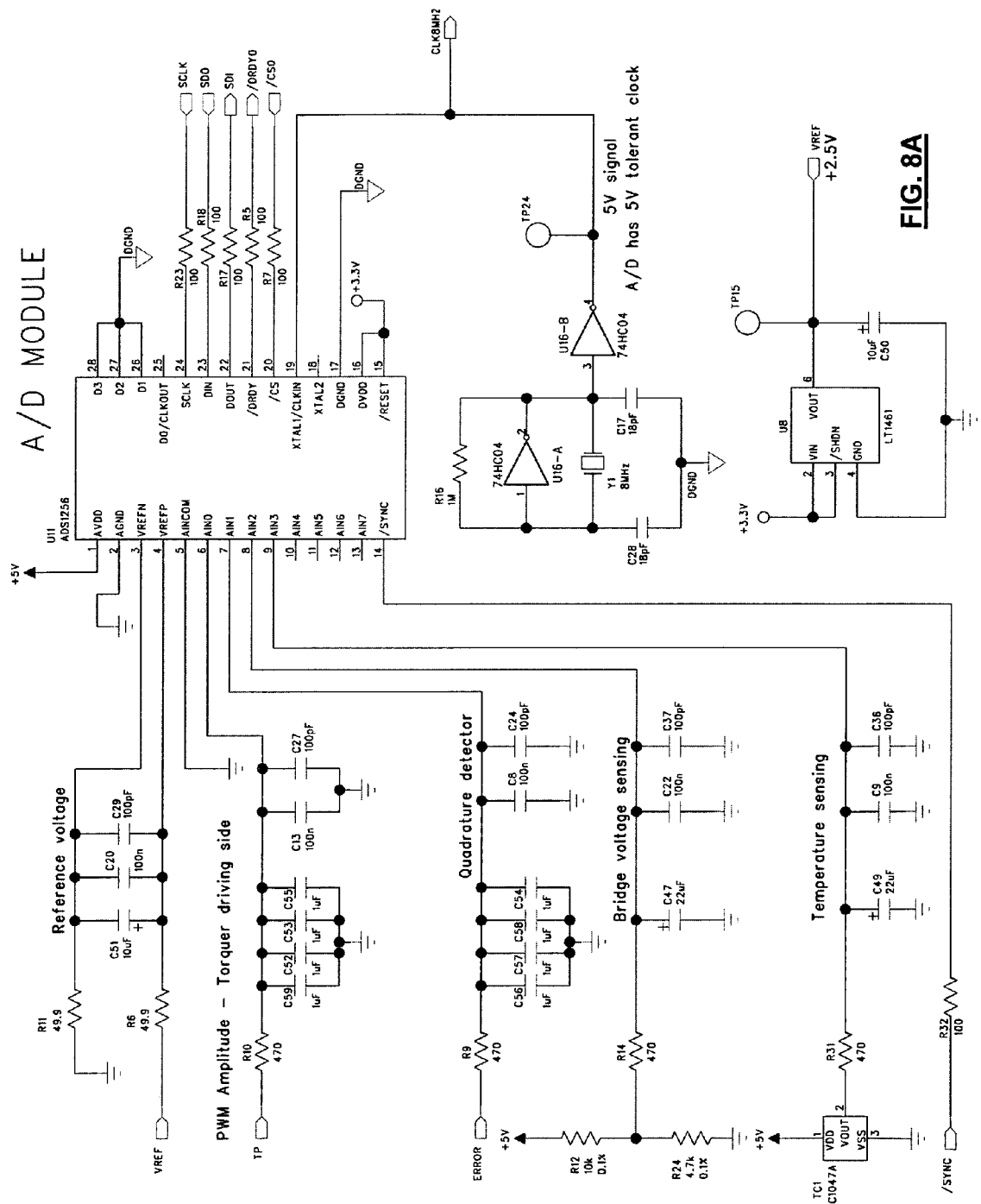
FIGS. 8A, 8B, 8C & 8D show a schematic view of the embodiment of FIGS. 1A, 1B & 1C.
Figure 8B:
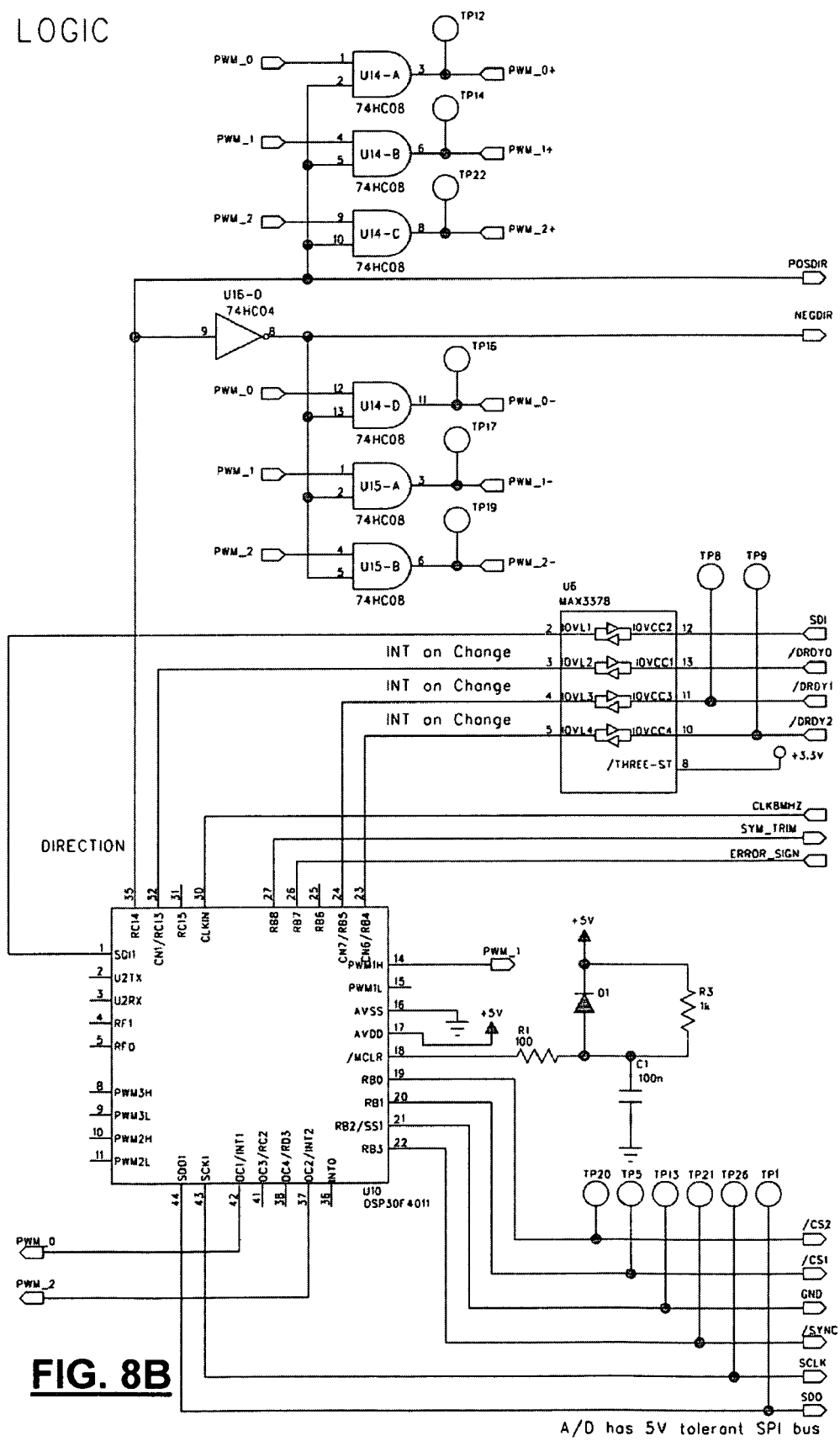
Figure 8C:
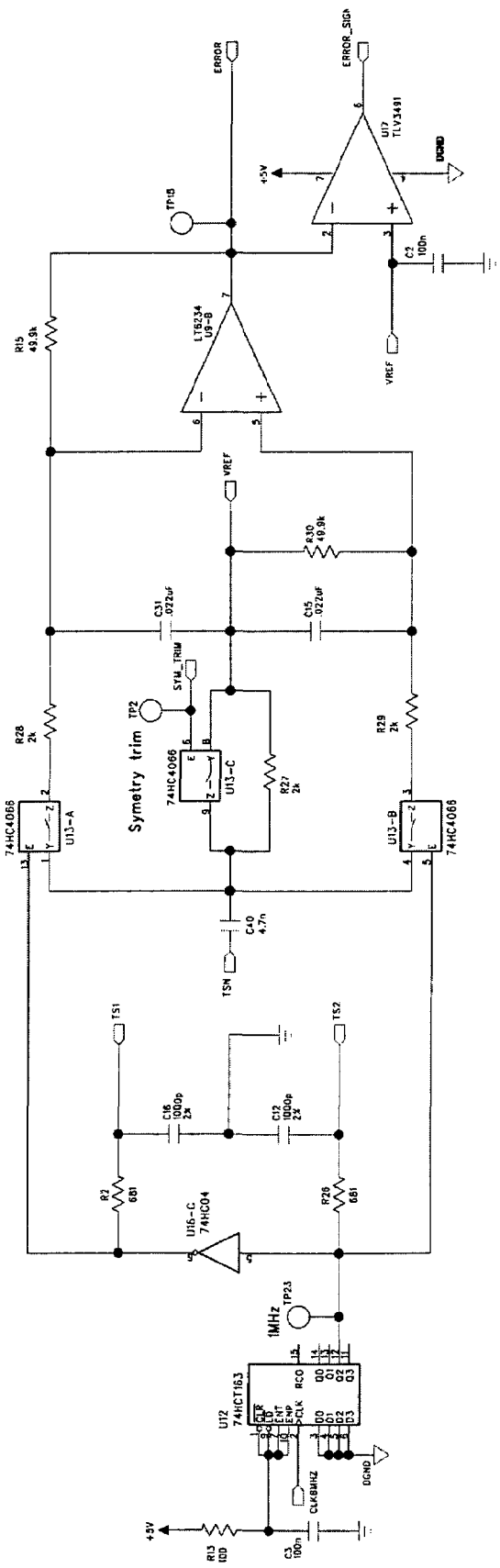
Figure 8D:
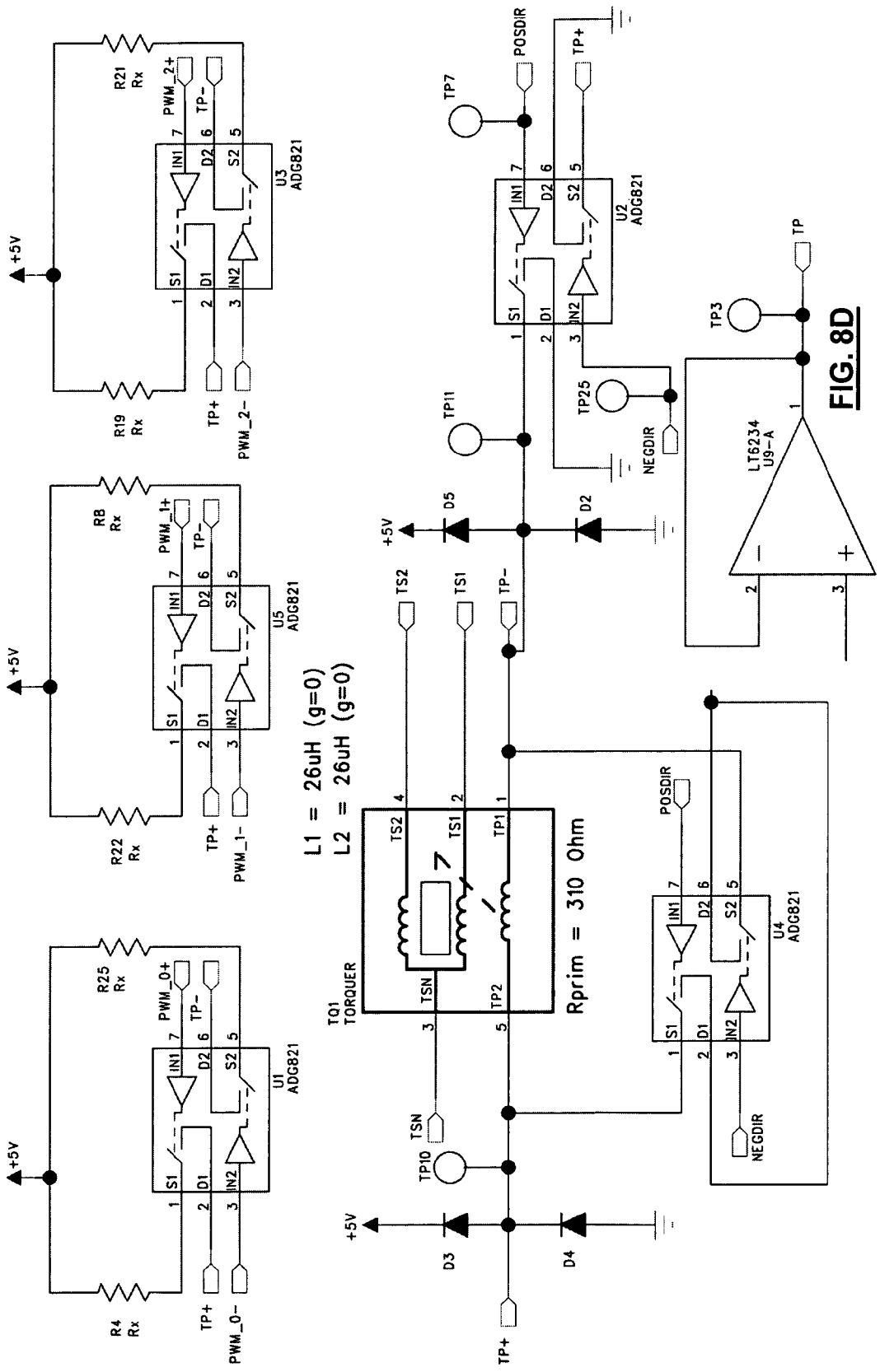

The pick-off coil 10 provides an angular position signal 12, e.g. a voltage signal, which is applied to a position detector 14, which is a differential position sensor in this example. The position detector 14 electronically senses the movement of the pick-off coil 10 and provides an analog output signal 16. The output signal 16 of the position detector 14 is applied to a high resolution analog-to-digital converter (ADC) 18, which provides a twenty four bit digital signal 20 representative of the angular position signal 12. The ADC 18 samples the output signal 16 once every sampling period $T_{SAMPLE}$ (FIGS. 7A & 7B).

The digital signal 20 is inputted into a digital signal processor 22 over a communication bus 23, where it is used in an algorithm to provide a feedback signal 36 (FIGS. 4A & 4B) to the pick-off coil 10. The processor 22 comprises a first pulse width modulation (PWM) generator 24, a second PWM generator 26 and an arithmetic logic unit (ALU) 28. The processor 22 also comprises a memory (not shown), which stores instructions representative of the algorithm, and which are executed by the processor 22.

The ALU 28, when configured by the instructions of the algorithm, comprises a multiplier 30 and a digital feedback network 32, which is a proportional-integral-derivative filter in this embodiment. The digital feedback network 32 is part of a negative feedback loop that controls the angular position of the pick-off coil 10, and has a transfer function optimized for this purpose.

Transfer functions in negative feedback loops are well developed in the art, and the particular transfer function used in the digital feedback network 32 is a design decision. In other embodiments, the digital feedback network 32 can be a fuzzy logic network that adapts the parameters of the transfer function of the network 32 depending on the angular position signal 12, or can comprise the common regulator algorithm, i.e. the Kalman regulator, which is a predictive algorithm that attempts to differentiate noise from the signal 12.

Figure 4A:
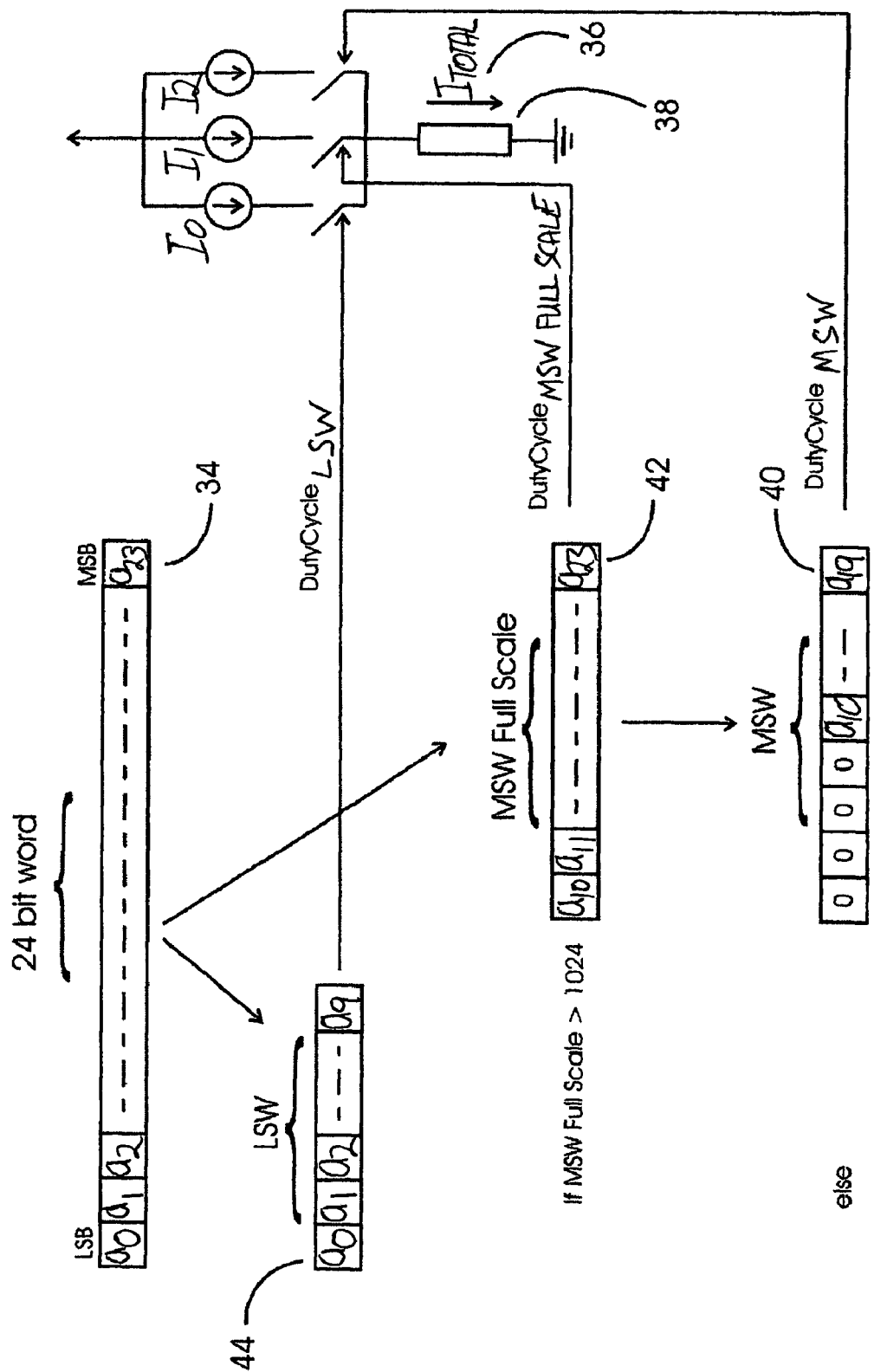

The algorithm is a feedback algorithm which accepts the digital signal 20 and provides the digital feedback signal 34, which is a twenty four bit word as shown in FIGS. 4A & 4B. The digital feedback signal 34 is representative of a duty cycle for a feedback signal 36 that is applied to a torque coil 38. The feedback signal 36 is a high resolution, pulse width modulated signal which also varies in amplitude. The unbalanced weight 13 is brought back into balance by applying the correct feedback signal 36 to the torque coil 38.

The algorithm in the processor 22 calculates the required twenty four bit digital feedback signal 34, i.e. the duty cycle value, and splits it into two segments according to the following procedure. The digital feedback signal 34 comprises a most significant word (MSW) and a least significant word (LSW). The MSW comprises the top fourteen bits of the twenty four bit digital feedback signal 34, and the LSW comprises the lower ten bits of the twenty four bit digital feedback signal 34. If the MSW is less than one thousand and twenty four (1024), then the MSW is multiplied by sixteen, to extend it up to a fourteen bit value, providing an MSW segment 40. If the MSW is greater than or equal to one thousand and twenty four (1024) then its value is unmodified and provides an MSW Full Scale segment 42. The LSW provides an LSW segment 44.

The MSW segment 40 and the MSW Full Scale segment 42 are used to set the duty cycle of a first PWM signal 46 (FIGS. 1A, 1B & 1C), which is a digital signal, from the PWM generator 24. In each of the sampling periods $T_{SAMPLE}$, only one of the segments 40 or 42 is used, i.e. the segments 40 and 42 are mutually exclusive, since the MSW of the digital feedback signal 34 is constant for each sampling period $T_{SAMPLE}$. The LSW segment 44 is used to set the duty cycle of a second PWM signal 48, which is a digital signal, from the PWM generator 26.

The processor 22 provides the first and second PWM signals 46 and 48 and first and second control signals 52 and 54 to a multiplexor 50. The first control signal 52 indicates whether the duty cycle of the first PWM signal 46 is controlled by the MSW segment 40 or the MSW Full Scale segment 42. The second control signal 54 controls the direction of the feedback signal 36 through the torque coil 38, as will be explained in more detail below.

The multiplexor 50 provides eight switch control output signals 56, 58, 60, 62, 64, 66, 68 and 70 that control switches $SW_1$-$SW_8$, respectively. The switches $SW_1$-$SW_8$ are preferably solid state switches, such as a MOSFET device, but can be other types of switches, such as mechanical switches.

The switch control signals 56 and 62 correspond to the first PWM signal 46 when the MSW full scale segment 42 controls the duty cycle of the signal 46. The switch control signals 58 and 64 correspond to the first PWM signal 46 when the MSW segment 40 controls the duty cycle of the signal 46. The switch control signals 60 and 66 correspond to the second PWM signal 48, whose duty cycle is controlled by the LSW segment 44.

The switch control signals 68 and 70 determine the direction of the feedback signal 36 in the torque coil 38. The switches SW1-SW8 and the switch control signals 56-70 together establish six channels 72-82 of electrical energy, i.e. current and/or voltage, which are selectively switched on to create the feedback signal 36. Table 1 below indicates which of the switches SW1-SW8 are on for each of the channels 72-82. The column labelled "Direction" indicates the direction the current in the respective channel flows through the torque coil 38. The quiescent current in each of channels 72, 74, 76, 78, 80 and 82 is substantially determined by resistors R1, R2, R3, R4, R5 and R6, respectively, in this example.

The multiplexer 50 selects which of the channels 72-82 are to be driven. For each of the sampling periods $T_{SAMPLE}$, there are four channel combinations that may be selected. A first combination includes channels 72 and 76, a second combination includes channels 74 and 76, a third combination includes channels 78 and 82 and a fourth combination includes channels 80 and 82. In each of the combinations mentioned above, each of the channels 72-82 is selected mutually exclusively of the other channel, in this example.

TABLE 1

| Channel | SW1 | SW2 | SW3 | SW4 | SW5 | SW6 | SW7 | SW8 | Direction |
|---|---|---|---|---|---|---|---|---|---|
| 72 | on | off | off | off | off | off | off | on | positive |
| 74 | off | on | off | off | off | off | off | on | positive |
| 76 | off | off | on | off | off | off | off | on | positive |
| 78 | off | off | off | on | off | off | on | off | negative |
| 80 | off | off | off | off | on | off | on | off | negative |
| 82 | off | off | off | off | off | on | on | off | negative |

The first combination corresponds to the PWM signal 46, controlled by the MSW full scale segment 42, and the PWM signal 48 providing positive electrical energy, i.e. current and/or voltage, to the torque coil 38. The second combination corresponds to the PWM signal 46, controlled by the MSW segment 40, and the PWM signal 48 providing positive electrical energy to the torque coil 38.

The third combination corresponds to the PWM signal 46, controlled by the MSW full scale segment 42, and the PWM signal 48 providing negative electrical energy, i.e. current and/or voltage, to the torque coil 38. The fourth case corresponds to the PWM signal 46, controlled by the MSW segment 40, and the PWM signal 48 providing negative currents to the torque coil 38.

The channels 74 and 80, which correspond to positive and negative current contributions of the PWM signal 46 controlled by the MSW full scale segment 42, are used to extend the pulse duration and to decrease the pulse amplitude to deliver the same amount of energy in order to reduce the overall amplitude of the current being switched, and, therefore, reduce the amount of noise caused by the switching.

The positive electrical signal of the channel 72, which is applied to the torque coil 38, corresponds to the negative electrical signal of the channel 78, which is also applied to the coil 38. The electrical signals of the channels 72 and 78 are substantially equal in magnitude and opposite in direction. In the present embodiment, in order to achieve substantially equal magnitudes of the electrical signals of the channels 72 and 78, resistors R1 and R4 are preferably well matched in value.

In a similar manner, resistors R2 and R5 are preferably well matched in value so that the electrical signals of the channels 74 and 80 are substantially equal in magnitude, and resistors R3 and R6 are preferably well matched in value so that the electrical signals of the channels 76 and 82 are substantially equal in magnitude. In other embodiments, it is possible to use active current sources instead of resistors in order to achieve highly matched electrical signals in respective corresponding channels 72 & 78, 74 & 80 and 76 & 82.

Figure 5:
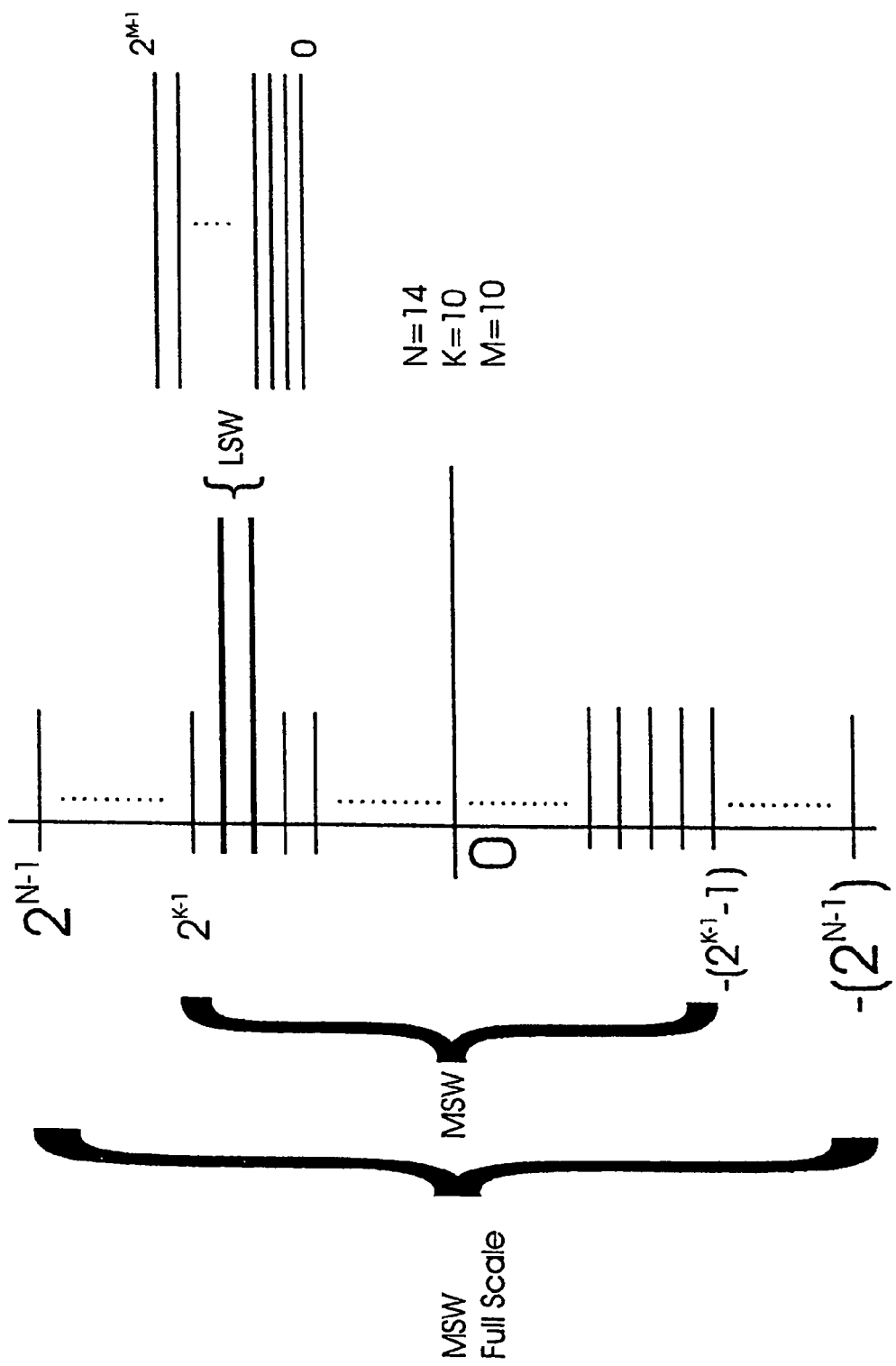
FIG. 5 shows a diagrammatic view of the resolution of the digital-to-analog converter of the embodiment of FIGS. 1A, 1B & 1C.

The current signals of the channels 72 and 78, corresponding to the MSW full scale segment 42, are greater in magnitude than the current signals of the channels 76 and 82, which correspond to the LSW segment 44. This aspect allows the two low resolution PWM generators 24 and 26, which are fifteen bit PWM generators in this example, to provide a digital-to-analog converter of twenty four bit resolution, and therefore increased dynamic range. This is diagrammatically illustrated in FIG. 5.

Figure 6:
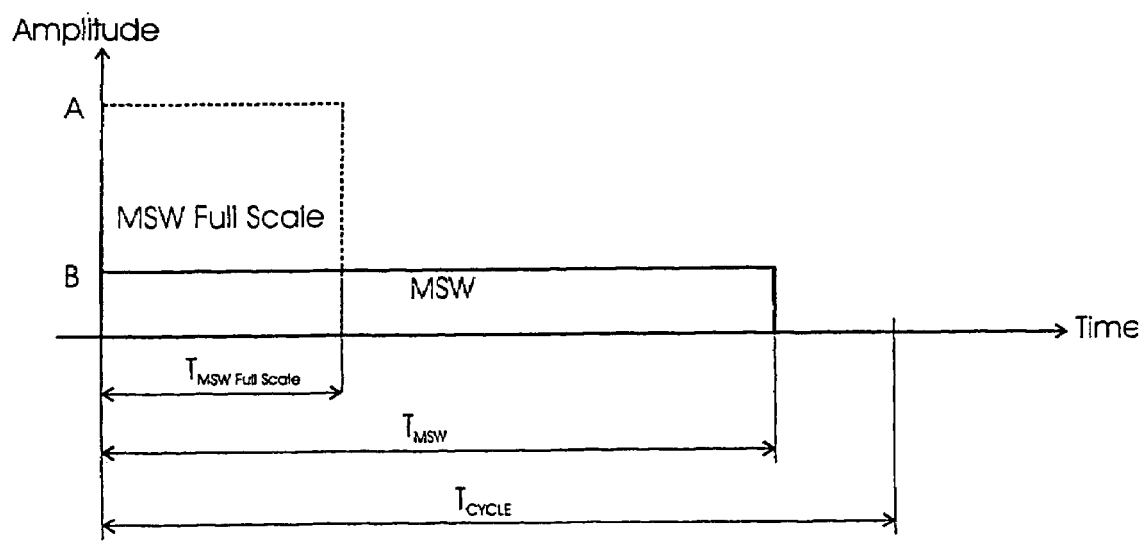
FIG. 6 shows a graphical view of electrical energy delivered to a torque coil of the embodiment of FIGS. 1A, 1B & 1C.

The current signals of the channels 74 and 80, which correspond to the MSW segment 40, are also greater in magnitude than the current signals of the channels 76 and 82, which correspond to the LSW segment 44, but less in magnitude than the current signals of the channels 72 and 78, which correspond to the MSW full scale segment 42. However, since the MSW segment 40 is derived by multiplying the MSW of the digital feedback signal 34 by sixteen, the time base of the current signals of the channels 74 and 78 are extended. The current signals of the channels 74 and 78 are therefore applied over a greater period of time, and the effective resolution is therefore equivalent to the MSW full scale segment. This is diagrammatically illustrated in FIG. 6.

The acceleration is calculated based on the digital feedback signal 34 and the electrical signals of the channels 72-82, and in particular the current signals of the channels, since the acceleration is proportional to the total current through the torque coil 38. The total current through the torque coil is proportional to the current signals of each the channels 72-82 and the respective duty cycles of those current signals. An equation for calculating total current through the torque coil 38 is illustrated in FIGS. 4A & 4B.

In addition to the feedback loop described above for the angular position signal 12, there are additional feedback paths that are used to compensate for temperature effects, power supply drift, amplifier offset of the position detector 14 and changes in the parametric values of the resistors R1-R6, the switches SW1-SW6 and the torque coil 38. When these parametric values change, then accordingly the values of the electrical signals of the channels 72-82.

Recalling that the measured value of acceleration is based on calculating the total current through the torque coil, which is proportional to the current signals of the channels 72-82 and their respective duty cycles, if the current signals of the channels 72-82 change then the measured value of the acceleration changes as well. Therefore in order to provide ongoing calibration of the accelerometer, these changes must be tracked and compensated for.

By providing the above multiple feedback paths, the digital accelerometer of the present invention is able to track and compensate for very low frequency signals, such as drift, while simultaneously measuring the angular position signal 12, even when the signal 12 is also a comparably low frequency signal.

Referring again to FIGS. 1A, 1B & 1B, there is a calibration analog-to-digital converter 92, a temperature sensor 94 and a voltage divider 96. The temperature sensor 94 provides an analog measurement of the ambient temperature in the form of a temperature signal 98. The voltage divider provides a power supply signal 100, which is a scaled version of a power supply voltage.

The calibration analog-to-digital converter 92 converts the temperature signal 98, the power supply signal 100, an amplifier offset signal 102 and torque coil signals Cal− and Cal+ into corresponding digital signals used by the algorithm, and in particular the digital feedback network 32, to compensate the PWM signals 46 and 48 for changes in these signals over time.

Figure 3:
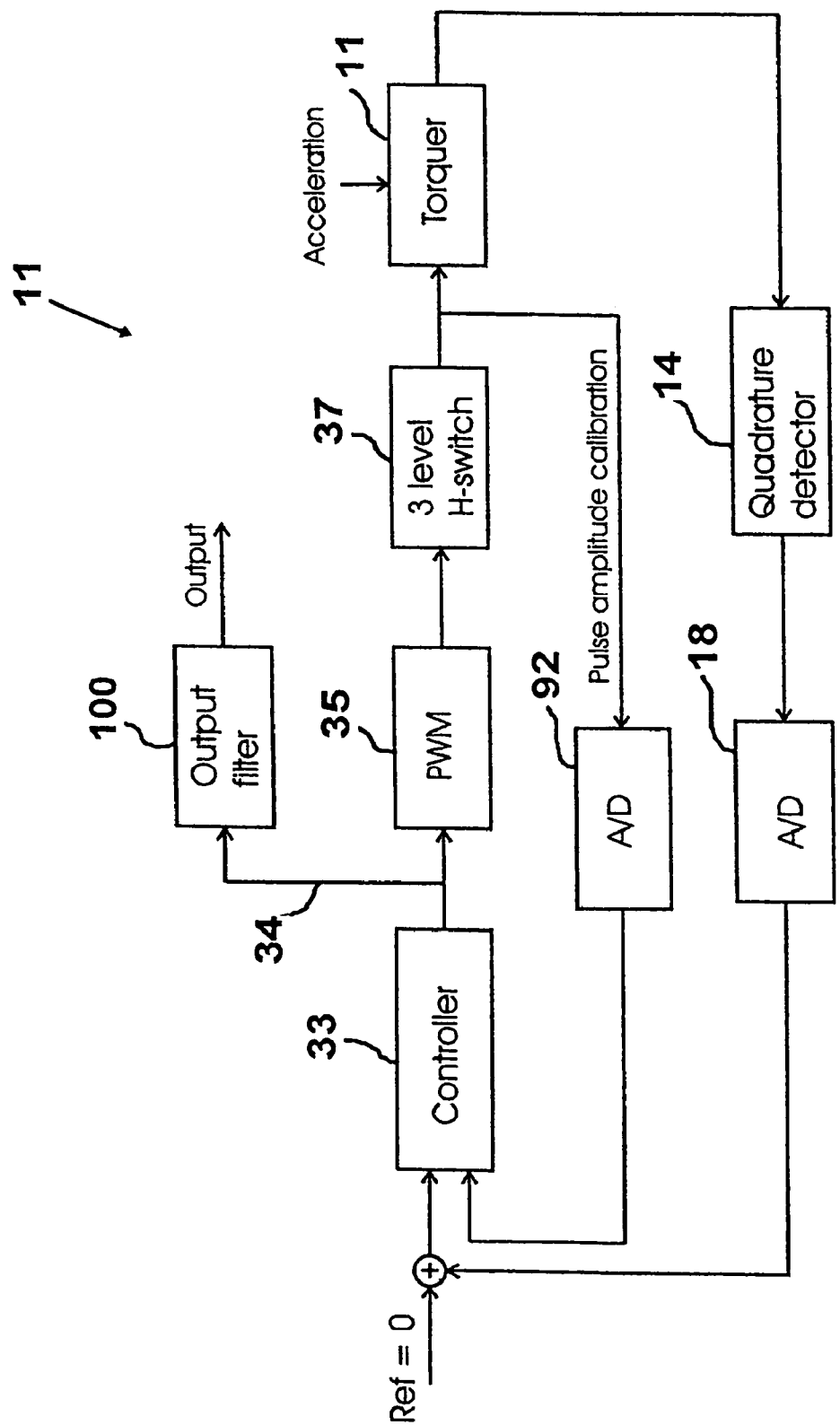
FIG. 3 shows a block diagram view of the accelerometer and a negative feedback loop of the embodiment of FIGS. 1A, 1B & 1C.

Referring again to FIG. 3, there is a block diagram of the force-balance type accelerometer 11 and the negative feedback network described above. A controller block 33 comprises the multiplier 30 and the digital feedback network 32. A PWM generator block 35 comprises the PWM generators 24 and 26. A three level switch block 37 comprises the multiplexor 50, the switches SW1-SW8 and the resistors 72-82.

Referring now to FIGS. 7A & 7B, the operation of the accelerometer, and more particularly the feedback signal 36, is now described for a sampling period $T_{SAMPLE}$. FIGS. 7A & 7B has a first graph 84 illustrating the first PWM signal 46 when the duty cycle is being controlled by the MSW full scale segment 42, a second graph 86 illustrating the first PWM signal 46 when the duty cycle is being controlled by the MSW segment 40, a third graph 88 illustrating the second PWM signal 48 and a fourth graph 90 illustrating a voltage across the torque coil 38. The graphs 84, 86, 88 and 90 illustrate two consecutive sampling periods $T_{SAMPLE}$. The horizontal axes of the graphs 84, 86, 88 and 90 represent time and the vertical axes represent voltage. The horizontal axes of the graphs 84, 86, 88 and 90 of FIGS. 7A & 7B refer to the following stages:

| Stage | Name |
| --- | --- |
| A | PRELOAD |
| B | MSW (or MSW FULL SCALE) |
| C | MSW WAIT |
| D | COMPENSATION |
| E | WAIT COMPENSATION |
| F | LSW |
| G | IDLE |

The PWM cycle starts with a PRELOAD pulse at stage A that charges the torque coil 38. The PRELOAD pulse is always present regardless of the duty cycle. After the PRELOAD pulse, a MSW (or MSW Full Scale) pulse is generated at stage B with a duration that matches the MSW (upper fourteen or ten bits) of the digital feedback signal 34. After the MSW pulse there is a MSW WAIT period at stage C, which is initiated to allow the coil to discharge. The MSW WAIT period duration is fixed.

After the MSW WAIT period, a COMPENSATION pulse is generated at stage D to compensate for the presence of the PRELOAD pulse. The COMPENSATION pulse is generated in the opposite direction of the PRELOAD pulse. There is an additional WAIT COMPENSATION period initiated at stage E to wait for the coil to discharge.

After the WAIT COMPENSATION pulse, a LSW pulse is fired to generate the residual LSW at stage F. An IDLE period at stage G after the LSW is variable in length and its purpose is only to add up time up to the next cycle and to allow for the torque coil 38 to discharge. A full period of the cycle $T_{SAMPLE}$ represents both the sampling and the PWM update frequency.

It is an advantage of the present invention to use the combination of the PRELOAD pulse and the equal but opposite COMPENSATION pulse. The COMPENSATION pulse cancels the transient energy delivered to the torque coil 38 caused by the PRELOAD pulse activating the switches SW1 or SW2, thereby ensuring that the total energy delivered to the torque coil 38 is controlled precisely by the PWM signal 46 and 48, and therefore the digital feedback signal 34. The current signals of the channels 76 and 82 are relatively small, in this example, and therefore not much transient energy is created when switching on the switches SW3 and SW6.

Assuming that the pulse amplitude, i.e. the amplitude of the current signals through the torque coil 38, is stable, its compensation does not take place every cycle. The compensation takes place either on a random basis or at a fixed period. The pulse has to be of a certain duration to provide enough time for the ADC 18 to complete the conversion. If the required pulse width, at the time when amplitude measurement is to take place, is too small, then the pulse width gets extended up to the point that the analog to digital conversion may successfully complete. The extra amount of time added to MSW (or MSW Full Scale) to allow for the analog to digital conversion of the ADC 18 to complete is compensated by the extended duration of the COMPENSATION pulse. This technique entirely encapsulates the process of calibration normally invisible from the data collection point of view.

The force generated by the torque coil 38 due to the feedback signal 36 on the unbalanced weight 13 is in a direction opposite to force created by the input acceleration, and rises in value until the force generated matches the force of input acceleration, i.e. the current through the torque coil 38 is directly proportional to the acceleration. Thus, the acceleration is directly obtained by reading the digital feedback signal 34, i.e. the PWM duty cycle value, which actually is the output of the system.

The feedback signal 36 has a significant amount of high frequency components related to the PWM switching that are eliminated by a low pass filter, preferably an FIR type, to provide a linear phase response.

In other embodiments, it is possible to overlap the MSW stage (or the MSW FULL SCALE stage) and the LSW stage. As an example, this is possible when the electrical signals of the channels 72-80 are provided by current sources. In this situation, the electrical signals are added together and applied to the torque coil 38.

Referring to FIGS. 1A, 1B, 1C & 3, there is an output filter block 106 which receives as an input the digital feedback signal 34. The digital feedback signal 34 is an extremely accurate, controlled feedback signal that may be used for other purposes. The output filter removes high frequency components introduced as a result of switching on and off the switches SW1-SW6.

Figure 1B:
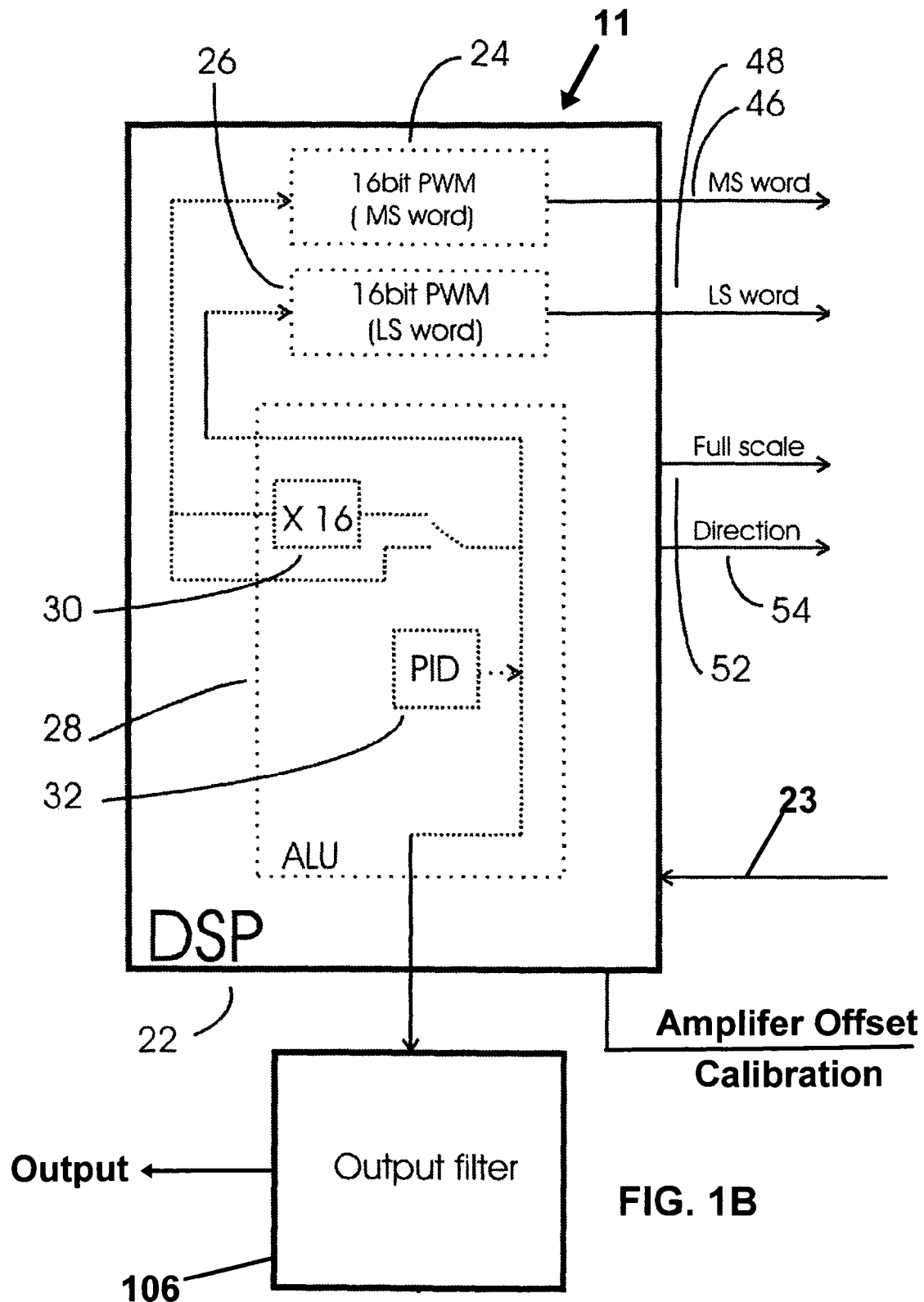
Figure 1C:
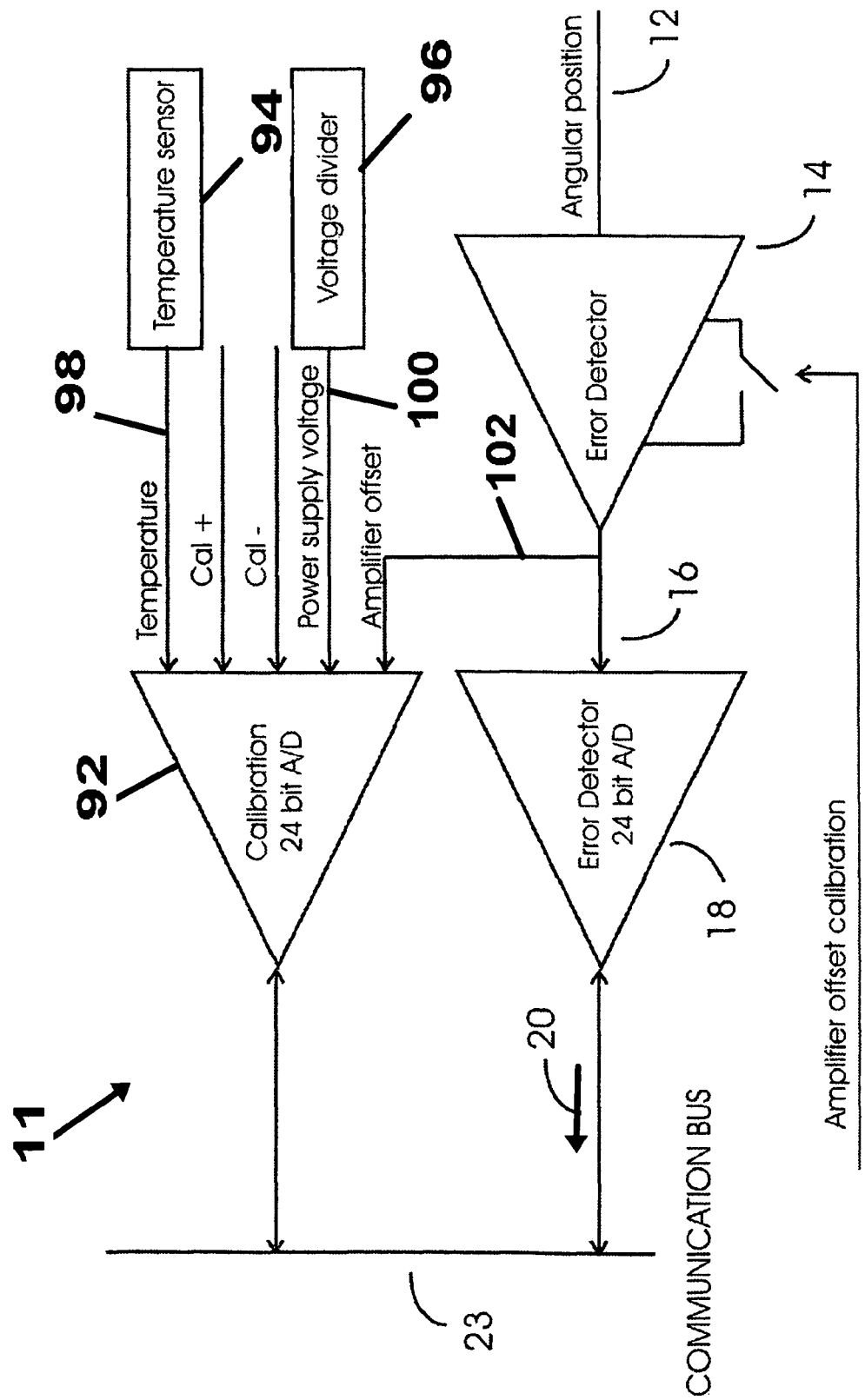
Figure 2:
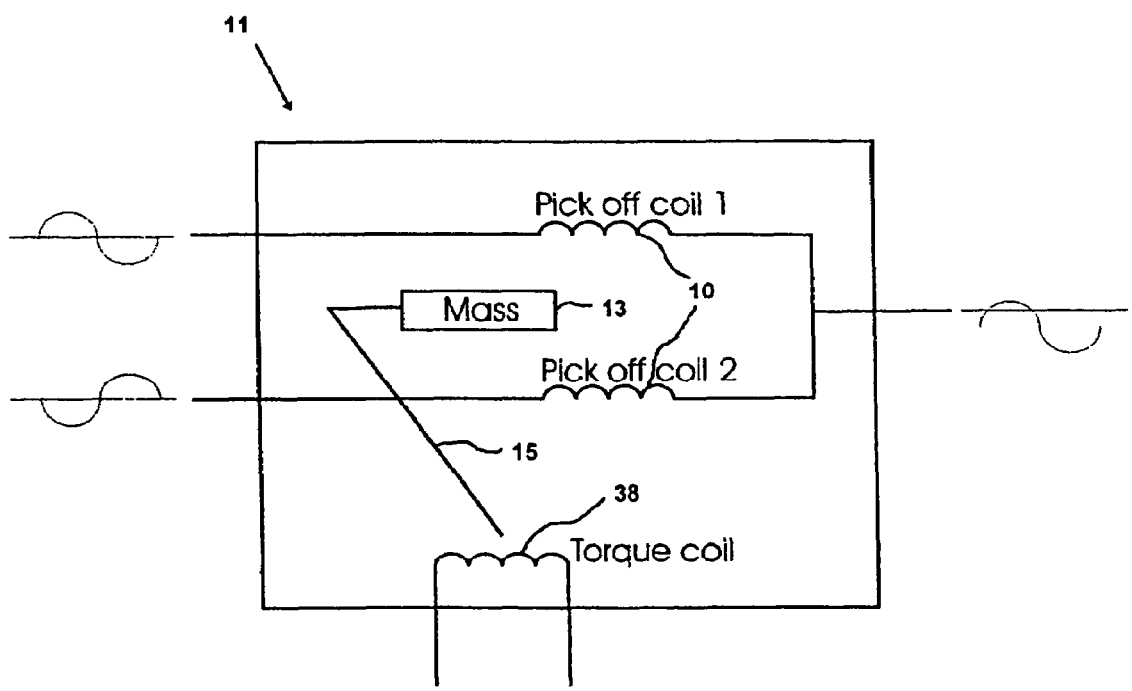
FIG. 2 shows a schematic view of elements of an accelerometer of the embodiment of FIGS. 1A, 1B & 1C.

Referring now to FIGS. 8A, 8B, 8C and 8D, there is shown a schematic diagram of the embodiment of FIGS. 1A, 1B and 1C.

As apparent to those skilled in the art, various modifications can be made to the above described solution within the scope of the appended claims. For example, the resistors R1, R2, R3, R4, R5 and R6 can be replaced by current sources, or by the resistors of different values to allow for different scale factors. By varying the bandwidth of the low pass FIR filter the overall system bandwidth can be changed to allow for different dynamic response and/or output noise level (dynamic resolution). Also, the output FIR filter can be replaced by a more sophisticated estimator, such as Kalman regulator, to further reduce the amount of noise. Moreover, the output FIR filter can be removed from the circuitry to allow for non-real time signal processing to facilitate use of more sophisticated and complex algorithms normally not deployed in real time due to the required processing power. The current distribution (ratio of the currents in the channels 72, 74 and 76 and in channels 78, 80 and 82) can be achieved in many different ways to allow for different implementation of the current source, duty cycle, sampling frequency, etc. The proposed solution relates to a single axis acceleration measurement but the circuit can be easily modified to obtain two- and triaxial acceleration measurement. In that case, a single DSP with six channel PWM generators can be used to simultaneously drive three double level PWM signals for three channels through three different multiplexers and three H bridges. The discussed PWM drive can also be applied in different applications wherever a high resolution D/A conversion in form of PWM is required.

As will be apparent to those skilled in the art, various modifications may be made in the above-described embodiment of the present invention within the scope of the appended claims.

I claim:

1. A force-balance accelerometer, comprising:
   a movable seismic mass;
   a pick-off coil responsive to displacement of the seismic mass from a balance position for providing an output corresponding to the displacement;
   means for converting the output of the pick-off coil to a digital signal;
   the means for converting comprising two pulse width modulation generators;
   the pulse width modulation generators outputting the digital signal as successive first and second PWM signals concatenating two different electrical energy levels in mutually different time slots;
   a torque coil responsive to the digital signal for rebalancing the seismic mass by restoring the mass to the balance position.

2. The force-balance accelerometer as claimed in claim 1, including switches controlled in accordance with the first and the second PWM signals, respectively, for applying electrical signals to the torque coil.

3. The force-balance accelerometer as claimed in claim 2, wherein one of the electrical signals includes data representing a preload control voltage.

4. The force-balance accelerometer as claimed in claim 3, wherein another one of the electrical signals includes data representing a compensation control voltage for compensating the effect of the preload control voltage in the torque coil.

5. The force-balance accelerometer as claimed in claim 2, wherein the first PWM signal includes means for cancelling energy delivered to the torque coil when activating the switching means.

6. The force-balance accelerometer as claimed in claim 2, wherein the means for converting include a multiplexer responsive to the first and the second PWM signals and providing switch control signals for the switches in accordance with the first and second PWM signals.

7. The force-balance accelerometer as claimed in claim 1, wherein the accelerometer further includes means for outputting the digital signal as a PWM signal, a switching means for applying electrical signals to the torque coil, said switching means being responsive to the PWM signal, wherein the PWM signal comprises means for cancelling energy delivered to the torque coil when activating the switching means.

8. The force-balance accelerometer as claimed in claim 1, wherein the first PWM signal comprises a first duty cycle corresponding to a most significant word of the digital signal and the second PWM signal comprises a second duty cycle corresponding to a least significant word of the digital signal.

9. The force-balance accelerometer as claimed in claim 1, wherein the means for converting the output of the pick-off coil to a digital signal includes an analog-to-digital converter, the analog-to-digital converter being responsive to the output of the pick-off coil.

10. The force-balance accelerometer as claimed in claim 1, wherein the means for converting the output of the pick-up coil to a digital signal includes a feedback network, the feedback network being responsive to the output of the pick-off coil and providing the digital signal.

11. The force-balance accelerometer as claimed in claim 1, wherein the means for converting the output of the pick-off coil to a digital signal employ a computer program executed on a processor and responsive to the output of the pick-off coil to provide the digital signal.

12. A force-balance accelerometer, comprising:
a movable seismic mass;
a pick-off coil responsive to displacement of the seismic mass from a balance position for providing an output corresponding to the displacement;
means for convening the output of the pick-off coil to a digital signal;
the means for converting comprising two pulse width modulation generators;
the pulse width modulation generators outputting the digital signal as successive first and second PWM signals concatenating two different electrical energy levels in mutually different time slots;
a torque coil responsive to the digital signal for rebalancing the seismic mass by restoring the mass to the balance position; and
the first PWM signal comprising a first duty cycle corresponding to a most significant word of the digital signal and the second PWM signal comprising a second duty cycle corresponding to a least significant word of the digital signal.

13. The force-balance accelerometer as claimed in claim 12, including switches controlled in accordance with the first and the second PWM signals, respectively, for applying electrical signals to the torque coil.

14. The force-balance accelerometer as claimed in claim 13, wherein one of the electrical signals includes data representing a preload control voltage.

15. The force-balance accelerometer as claimed in claim 14, wherein another one of the electrical signals includes data representing a compensation control voltage for compensating the effect of the preload control voltage in the torque coil.

16. The force-balance accelerometer as claimed in claim 13, wherein the first PWM signal includes means for cancelling energy delivered to the torque coil when activating the switching means.

17. The force-balance accelerometer as claimed in claim 12, including a switching means for applying electrical signals to the torque coil, said switching means being controlled in accordance with the first and second PWM signals, wherein the PWM signals comprises means for cancelling energy delivered to the torque coil when activating the switching means.

18. The force-balance accelerometer as claimed in claim 12, wherein the means for converting the output of the pick-off coil to a digital signal includes a feedback network, the feedback network being responsive to the output of the pick-off coil and providing the digital signal.

19. The force-balance accelerometer as claimed in claim 12, wherein the means for converting the output of the pick-off coil to a digital signal employ a computer program executed on a processor and responsive to the output of the pick-off coil to provide the digital signal.

20. The force-balance accelerometer as claimed in claim 12, wherein the means for converting include a multiplexer responsive to the first and the second PWM signals and providing switch control signals for the switches in accordance with the first and second PWM signals.

* * * * *